United States Patent
Kato et al.

(10) Patent No.: US 11,089,483 B2
(45) Date of Patent: Aug. 10, 2021

(54) SHARED FREQUENCY MANAGEMENT APPARATUS AND SHARED FREQUENCY MANAGEMENT METHOD

(71) Applicant: Panasonic Intellectual Property Management Co., Ltd., Osaka (JP)

(72) Inventors: Osamu Kato, Fukuoka (JP); Hideki Kanemoto, Kanagawa (JP); Hiroaki Asano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/582,725

(22) Filed: Sep. 25, 2019

(65) Prior Publication Data
US 2020/0367063 A1 Nov. 19, 2020

(30) Foreign Application Priority Data
May 15, 2019 (JP) .............................. JP2019-092390

(51) Int. Cl.
| | |
|---|---|
| *H04W 40/00* | (2009.01) |
| *H04W 4/00* | (2018.01) |
| *H04J 3/00* | (2006.01) |
| *H04W 16/14* | (2009.01) |

(52) U.S. Cl.
CPC .................. *H04W 16/14* (2013.01)

(58) Field of Classification Search
CPC ................................................ H04W 16/14
USPC ....................................................... 455/446
See application file for complete search history.

(56) References Cited

U.S. PATENT DOCUMENTS

| | | | | |
|---|---|---|---|---|
| 6,016,311 A * | 1/2000 | Gilbert | ................. | H04B 7/2646 370/280 |
| 2007/0253466 A1* | 11/2007 | Jones | .................... | H04W 16/14 375/131 |
| 2008/0144643 A1* | 6/2008 | Berg | ................. | H04W 72/0453 370/401 |
| 2008/0259857 A1* | 10/2008 | Zheng | .................... | H04B 7/155 370/329 |

(Continued)

OTHER PUBLICATIONS

Kishiyama et al., "Standardization Status towards the Introduction of 5G in 2020," *NTT Technical Review*, 29(1), 2017, 12 pages.

*Primary Examiner* — Mark G. Pannell
(74) *Attorney, Agent, or Firm* — Seed IP Law Group LLP

(57) ABSTRACT

A shared frequency management apparatus includes a communicator receiving application information regarding use of a shared frequency band from each of base stations of plural different communication companies, a determiner determining whether or not allocation of different TDD patterns during use of adjacent carrier frequencies among plural carrier frequencies included in the shared frequency band is possible on the basis of the application information from each base station, a setter setting the TDD pattern for each of the carrier frequencies on the basis of the application information from each base station and a determination result of whether or not allocation of the different TDD patterns is possible, and a decision unit deciding an allocation content of the shared frequency band to each base station, satisfying the application information from each base station, on the basis of a setting result of the TDD pattern for each carrier frequency.

8 Claims, 10 Drawing Sheets

(56) References Cited

U.S. PATENT DOCUMENTS

| | | | | |
|---|---|---|---|---|
| 2008/0287124 A1* | 11/2008 | Karabinis | .......... | H04B 7/18536 |
| | | | | 455/427 |
| 2011/0009065 A1* | 1/2011 | Carter | ................. | H04W 52/244 |
| | | | | 455/63.1 |
| 2014/0064233 A1* | 3/2014 | Oizumi | ............. | H04W 72/1289 |
| | | | | 370/329 |
| 2015/0382375 A1* | 12/2015 | Bhushan | ........... | H04W 72/1289 |
| | | | | 370/252 |
| 2016/0128001 A1* | 5/2016 | Tsuda | ................. | H04W 52/244 |
| | | | | 370/329 |
| 2017/0202006 A1* | 7/2017 | Rao | ................... | H04W 72/1231 |
| 2017/0215083 A1* | 7/2017 | Kudo | .................... | H04W 72/08 |
| 2019/0306769 A1* | 10/2019 | Muthuswamy | ....... | H04W 36/30 |

\* cited by examiner

FIG. 3

| TDD PATTERN | | | | | | | | | | | | | | DL : UL |
|---|---|---|---|---|---|---|---|---|---|---|---|---|---|---|
| P1 | D | D | D | D | D | D | D | U | D | D | D | D | U | 12:2 |
| P2 | D | D | D | D | U | D | D | U | D | D | D | U | U | 7:7 |
| P3 | D | D | U | U | U | U | U | U | D | D | U | U | U | 4:10 |

FIG. 4

| SET OF BASE STATIONS | TDD PATTERN IDENTICAL CARRIER FREQUENCY | TDD PATTERN DIFFERENT ADJACENT CARRIER FREQUENCY | TDD PATTERN DIFFERENT NON-ADJACENT CARRIER FREQUENCY |
|---|---|---|---|
| A2 – B1 | ○ | × | ○ |
| A2 – C1 | ○ | ○ | ○ |
| B1 – C1 | ○ | × | ○ |

| BASE STATION | DL THROUGHPUT [Gbps] | UL THROUGHPUT [Gbps] |
|---|---|---|
| A2 | 5 | 1 |
| B1 | 10 | 1 |
| C1 | 5 | 8 |
| ⋮ | ⋮ | ⋮ |

| CARRIER FREQUENCY | TDD PATTERN SETTING METHOD #1 | TDD PATTERN SETTING METHOD #2 | TDD PATTERN SETTING METHOD #3 |
|---|---|---|---|
| f1 | P1 | P1 | P2 |
| f2 | P1 | P1 | P1 |
| f3 | P2 | P1 | P1 |
| f4 | P2 | P3 | P3 |

FIG. 8

| | f1 | f2 | f3 | f4 | DL THROUGHPUT CALCULATED VALUE [Gbps] | UL THROUGHPUT CALCULATED VALUE [Gbps] |
|---|---|---|---|---|---|---|
| A2 | P1 | P1 | P2 | P2 | (1) 14.25 | (2) 1.90 |
| B1 | P1 | ~~P1~~ | ~~P2~~ | P2 | (3) 9.50 | (4) 0.90 |
| C1 | P1 | P1 | P2 | P2 | (5) 14.25 | (6) 15.20 |
| A2 | P1 | P1 | P1 | P3 | (7) 14.00 | (8) 1.73 |
| B1 | P1 | P1 | ~~P1~~ | ~~P3~~ | (9) 12.00 | (10) 0.40 |
| C1 | P1 | P1 | P1 | P3 | (11) 14.00 | (12) 13.87 |
| A2 | P2 | P1 | ~~P1~~ | ~~P3~~ | (13) 9.50 | (14) 1.00 |
| B1 | ~~P2~~ | ~~P1~~ | P1 | P3 | (15) 16.00 | (16) 12.00 |
| C1 | P2 | P1 | ~~P1~~ | ~~P3~~ | (17) 9.50 | (18) 8.00 |

ALLOCATION CONTENT PT1 CORRESPONDING TO TDD PATTERN SETTING METHOD #1 (rows A2, B1, C1 — first group)

ALLOCATION CONTENT PT2 CORRESPONDING TO TDD PATTERN SETTING METHOD #2 (rows A2, B1, C1 — second group)

ALLOCATION CONTENT PT3 CORRESPONDING TO TDD PATTERN SETTING METHOD #3 (rows A2, B1, C1 — third group)

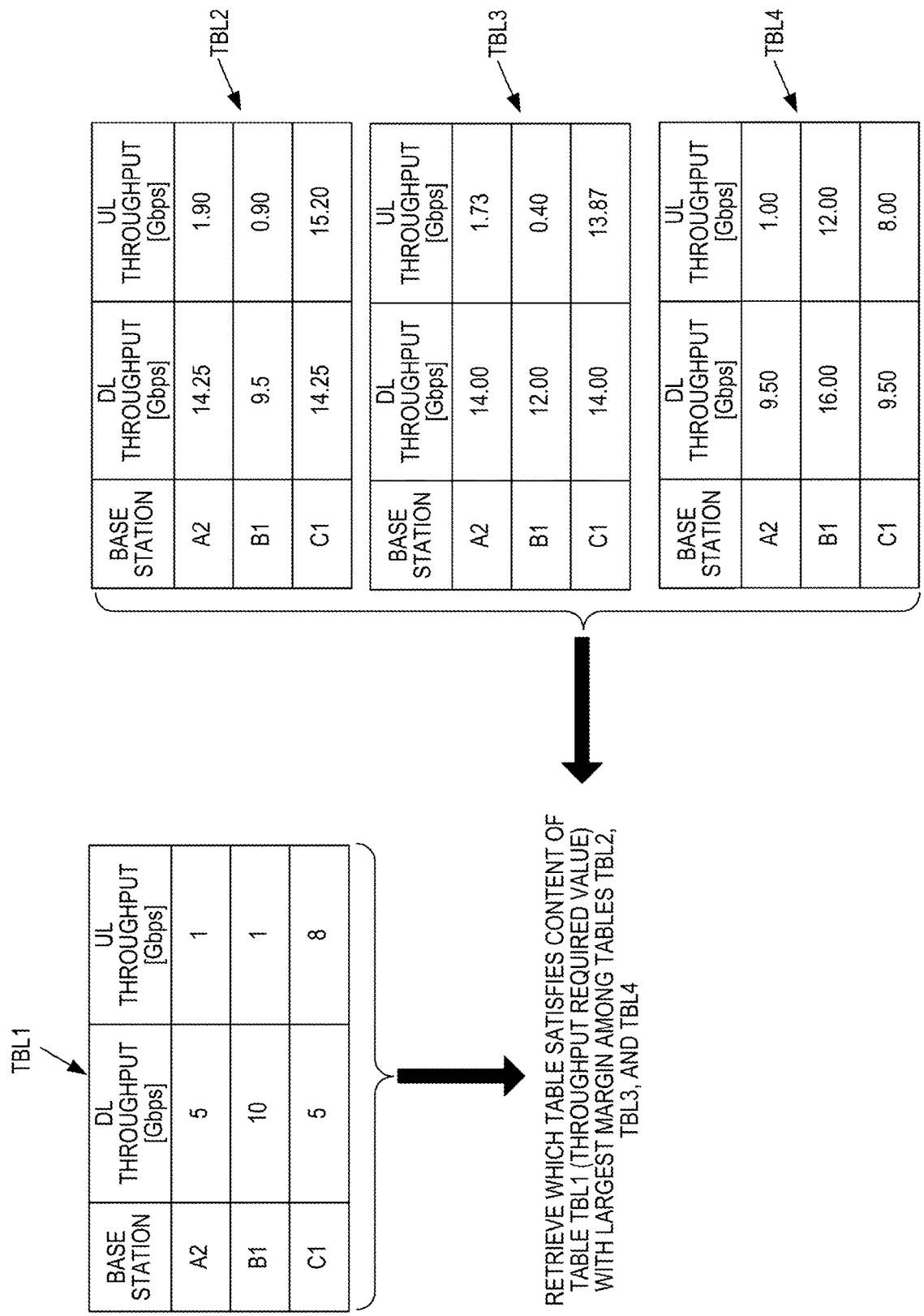

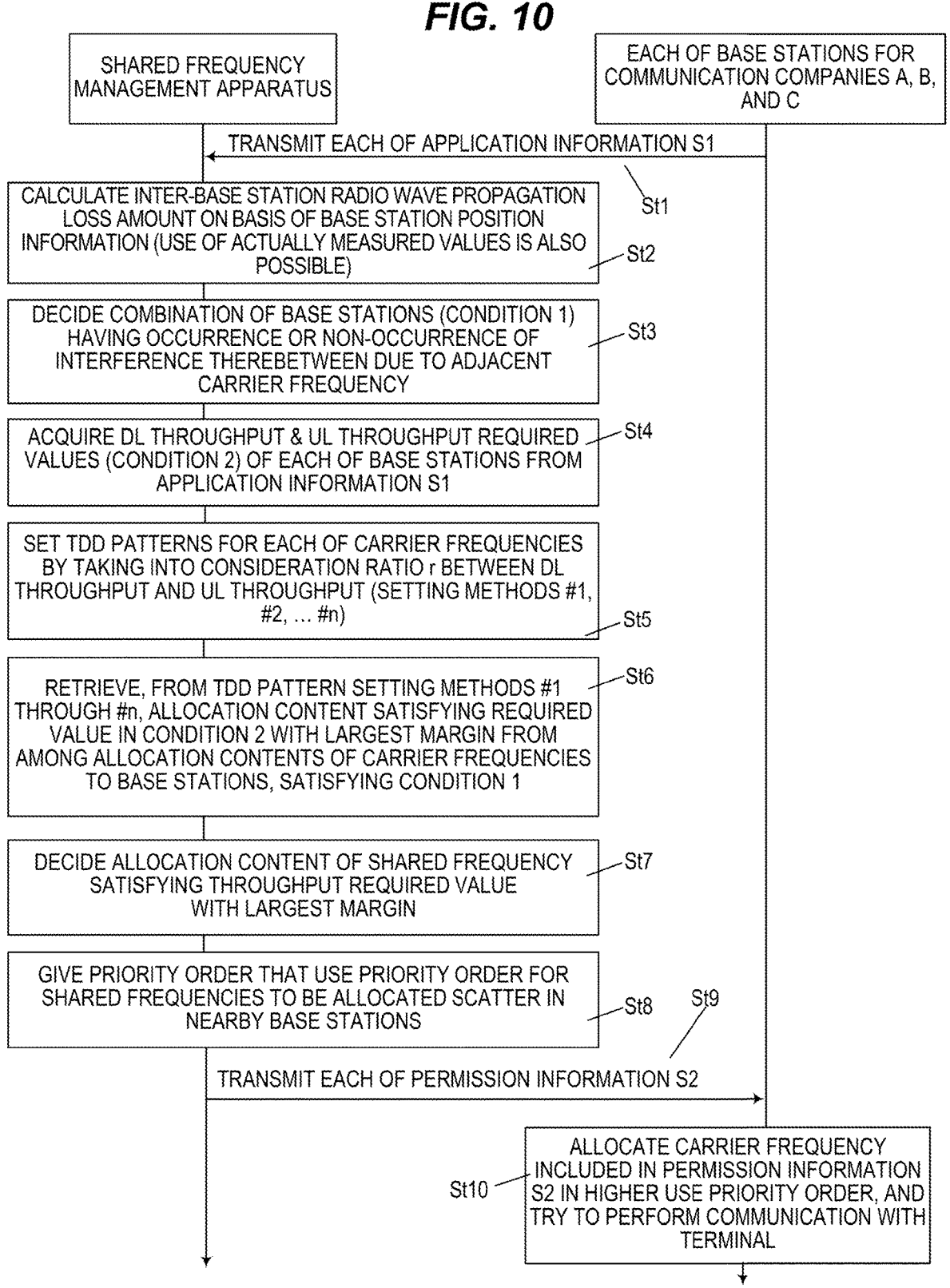

SHARED FREQUENCY MANAGEMENT APPARATUS AND SHARED FREQUENCY MANAGEMENT METHOD

BACKGROUND

1. Technical Field

The present disclosure relates to a shared frequency management apparatus and a shared frequency management method capable of managing a shared frequency shared by base stations of a plurality of different communication companies.

2. Description of the Related Art

Discussions on standardization of a new wireless interface specification for the fifth generation mobile communication system (5G) have been examined in the 3rd Generation Partnership Project (3GPP). For example, in Yoshihisa KISHIYAMA, Satoshi NAGATA, Takehiro NAKAMURA, "Standardization Status towards the Introduction of 5G in 2020", NTT Technical Journal, vol. 29, No. 1, 2017 (NPTL 1), a wireless frame configuration effective to realize low-delay retransmission control that is a task in a semi-fixed time division duplex (TDD) method of the related art while supporting a dynamic TDD method of dynamically switching between an uplink and a downlink at an identical carrier frequency has been examined as one of new wireless interface specifications. Specifically, a configuration has been examined in which a control signal for a downlink is fixed to a head of a subframe, a control signal for an uplink is fixed to an end of the subframe, and an intermediate portion thereof is dynamically allocated to data and various reference signals for the uplink and the downlink.

SUMMARY

In a TDD method wireless specification at a carrier frequency exclusively used by an identical communication company, it is possible to suppress interference among a plurality of base stations installed by the communication company to an allowable value or the like. For example, a distance between installed base stations may be set to be long, base stations may be installed such that prediction (line of sight: LOS) does not occur, or a plurality of base stations may be integrally managed (radio resource management: RRM) such that interference thereamong does not occur. Thus, as in NPTL 1, a dynamic time division duplex (TDD) method may be applied.

However, in a case where carrier frequencies of a shared frequency band (for example, a candidate frequency band which will be described later) are shared by base stations respectively installed by a plurality of communication companies, examined in the fifth generation mobile communication system (5G), in the dynamic time division duplex (TDD) method, it is difficult to fundamentally solve an interference problem that may normally occur among the base stations depending on positions of the base stations.

The present disclosure has been devised in consideration of the circumstances of the related art, and an object thereof is to provide a shared frequency management apparatus and a shared frequency management method capable of preventing the occurrence of interference that may normally occur among base stations when a carrier frequency of an RF band is shared by the base stations respectively installed by a plurality of different communication companies, and supporting realization of wireless communication satisfying a throughput required value.

According to the present disclosure, there is provided a shared frequency management apparatus including a communicator that receives application information regarding use of a shared frequency band from each of base stations of a plurality of different communication companies; a determiner that determines whether or not allocation of different time division duplex (TDD) patterns during use of adjacent carrier frequencies among a plurality of carrier frequencies included in the shared frequency band is possible on the basis of the application information from each base station; a setter that sets the TDD pattern for each of the carrier frequencies on the basis of the application information from each base station and a determination result of whether or not allocation of the different TDD patterns is possible; and a decision unit that decides an allocation content of the shared frequency band to each base station, satisfying the application information from each base station, on the basis of a setting result of the TDD pattern for each carrier frequency.

According to the present disclosure, there is provided a shared frequency management method executed by a shared frequency management apparatus, the method including receiving application information regarding use of a shared frequency band from each of base stations of a plurality of different communication companies; determining whether or not allocation of different time division duplex (TDD) patterns during use of adjacent carrier frequencies among a plurality of carrier frequencies included in the shared frequency band is possible on the basis of the application information from each base station; setting the TDD pattern for each of the carrier frequencies on the basis of the application information from each base station and a determination result of whether or not allocation of the different TDD patterns is possible; and deciding an allocation content of the shared frequency band to each base station, satisfying the application information from each base station, on the basis of a setting result of the TDD pattern for each carrier frequency.

According to the present disclosure, it is possible to prevent the occurrence of interference that may normally occur among base stations when a carrier frequency of an RF band is shared by the base stations respectively installed by a plurality of different communication companies, and to support realization of wireless communication satisfying a throughput required value.

BRIEF DESCRIPTION OF THE DRAWINGS

FIG. 3 is a diagram illustrating examples of TDD patterns formed of an uplink and a downlink;

FIG. 4 is a table illustrating an example of whether or not allocation of a TDD pattern is possible when carrier frequencies are used in respective base stations of three communication companies;

FIG. 8 is a table illustrating an example of a throughput calculated value for each of an uplink and a downlink corresponding to each setting method in FIG. 7;

FIG. 9 is a diagram illustrating an example of deciding a throughput calculated value satisfying a throughput required value with the largest margin;

FIG. 10 is a sequence diagram illustrating operation procedure examples of a wireless system according to Exemplary Embodiment 1;

DETAILED DESCRIPTION

Details leading to present disclosure

First, a case is supposed in which carrier frequencies of a shared frequency band (for example, the 26 GHz band) are shared by a plurality of base stations respectively installed by a plurality of communication companies, examined in the fifth generation mobile communication system (5G). In other words, in a case where different communication companies install base stations with a wireless system in which a duplex method as a wireless communication method is TDD in the vicinity (for example, within a distance at which interference has the influence) thereof, when frame timings and downlink (DL)/uplink (UL) patterns are not the same as each other (that is, not synchronized with each other) among the base stations, interference among the base stations of the different communication companies causes a great problem (refer to FIGS. 11 and 12).

Figure 11:
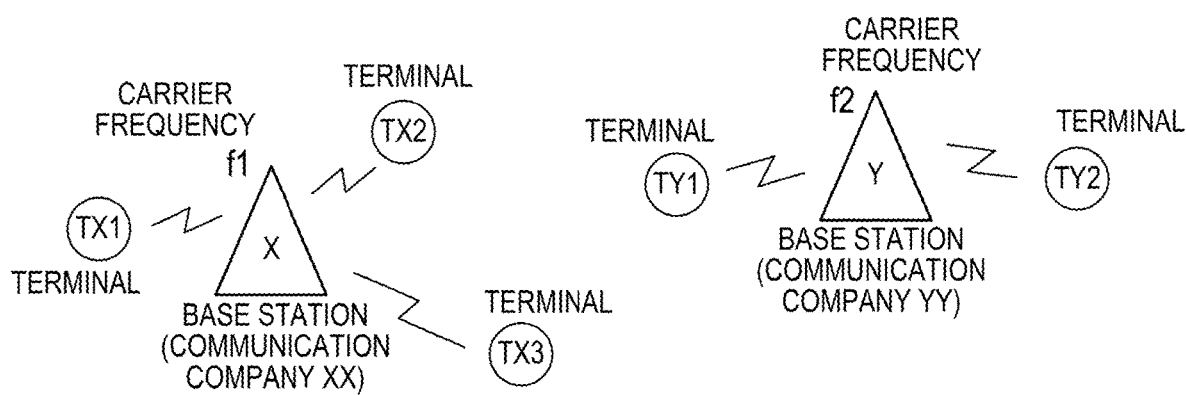
FIG. 11 is a diagram for describing the reason why synchronization is necessary among base stations respectively installed by a plurality of communication companies in the related art.
Figure 12:
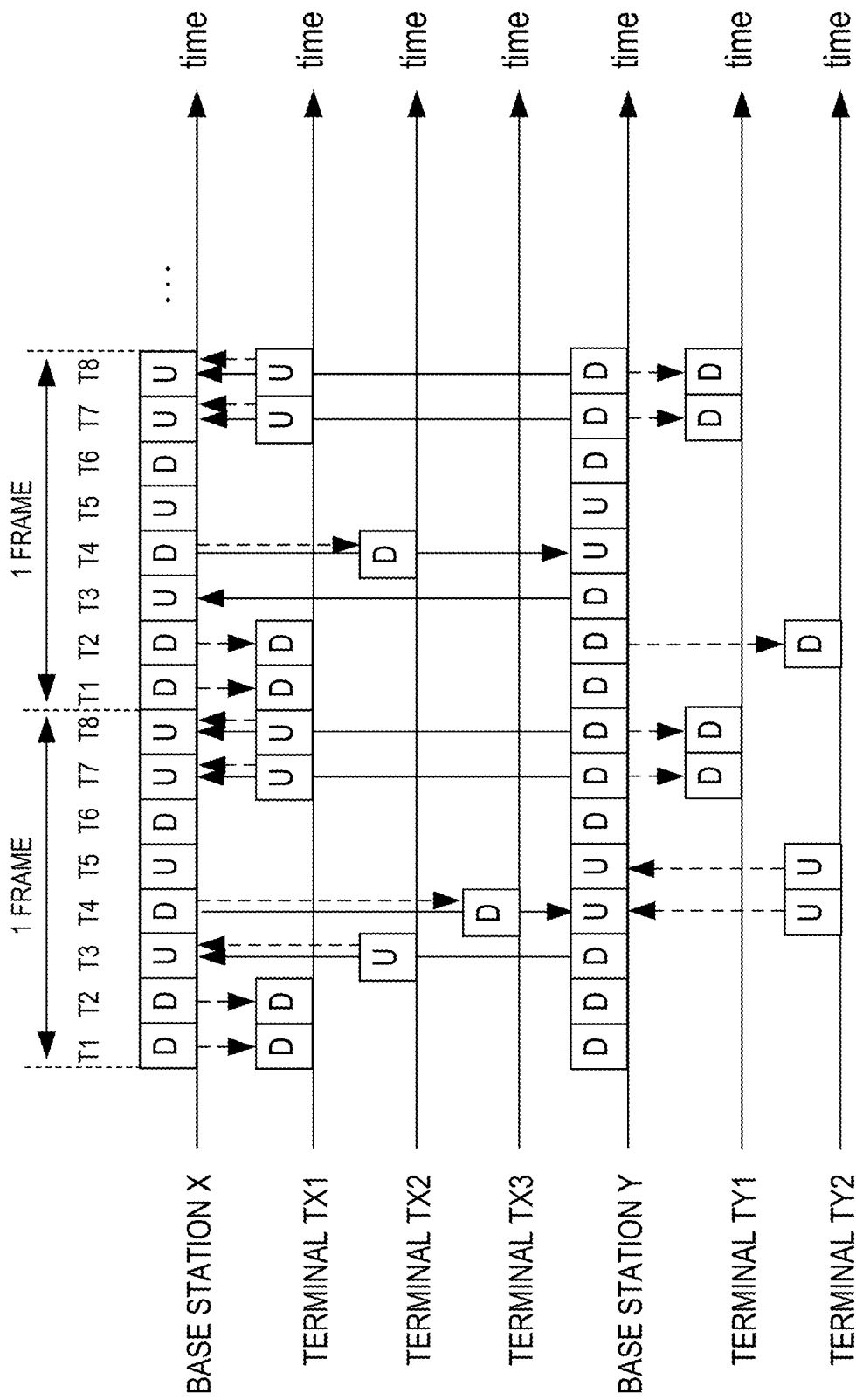
FIG. 12 is a diagram for describing the reason why synchronization is necessary among the base stations respectively installed by the plurality of communication companies in the related art.

Here, with reference to FIGS. 11 and 12, a description will be made of a reason why synchronization is necessary among base stations of different communication companies in the related art. FIGS. 11 and 12 are diagrams for describing the reason why synchronization is necessary among base stations respectively installed by a plurality of communication companies in the related art.

As illustrated in FIG. 11, base station X is installed by communication company XX, uses carrier frequency f1*l*, accommodates a plurality of (for example, three) terminals TX1, TX2, and TX3, and performs wireless communication therewith. Similarly, base station Y is installed by communication company YY, uses carrier frequency f2, accommodates a plurality of (for example, two) terminals TY1 and TY2, and performs wireless communication therewith. Communication company XX and communication company YY are different communication companies. Here, for better understanding of a description of FIG. 12, frame timings are the same as each other in one frame period of wireless communication in base stations X and Y.

If carrier frequencies f1 and f2 are the same as each other, a problem of interference between the base stations is fatal and thus cannot be solved as long as a radio wave propagation loss between base station X and base station Y cannot be secured to be considerably large. Therefore, a case is handled in which carrier frequencies f1 and f2 are not the same as each other, and are adjacent to be different from each other (refer to FIG. 5). In a case where carrier frequencies f1 and f2 are separated from each other instead of being adjacent to each other, interference hardly occurs, and thus a required separation distance between base station X and base station Y may be relatively small.

As illustrated in FIG. 12, in one frame period (formed of, for example, eight time slots T1, T2, T3, T4, T5, T6, T7, and T8) of wireless communication in base stations X and Y of the different communication companies, there may be a case where there is a time slot in which DL/UL patterns are not the same as each other. Specifically, DL/UL patterns in time slots T3, T4, T7, and T8 are different from each other in any one frame period. In other words, in time slot T3, base station X is in a UL (that is, a reception mode), but base station Y is in a DL (that is, a transmission mode). In time slot T4, base station X is in a DL (that is, a transmission mode), but base station Y is in a UL (that is, a reception mode). In time slots T7 and T8, base station X is in a UL (that is, a reception mode), but base station Y is in a DL (that is, a transmission mode). Mismatch in DL/UL patterns may normally occur since communication companies are different from each other.

Thus, since, for example, in time slot T3, base station X is in a reception mode of receiving uplink data (UL data) from terminal TX2, but base station Y is in the DL (that is, a transmission mode), base station X may receive a transmitted wave of downlink data (DL data) from base station Y, and thus there is a high probability that interference may occur between base stations X and Y. In other words, in a case where an interference level exceeds a predetermined value, a line error rate increases, and thus communication between a base station and a terminal is not established. Since, for example, in time slot T4, base station Y is in a reception mode of receiving uplink data (UL data) from terminal TY2, but base station X is in the DL (that is, a transmission mode), base station Y may receive a transmitted wave of downlink data (DL data) from base station X, and thus there is a high probability that interference may occur between base stations X and Y. In either of time slots T7 and T8, there is a high probability that interference may occur between base stations X and Y in the same manner. In other words, in a case where an interference level exceeds a predetermined value, a line error rate increases, and thus communication between a base station and a terminal is not established.

It is hardly supposed that base stations X and Y are easily moved after being respectively once installed by communication companies unlike terminals TX1, TX2, TX3, TY1, and TY2 that can be easily moved. Thus, in a case where mismatch between DL/UL patterns is present among base stations of a plurality of different communication companies, interference may normally occur.

However, in reality, it may be considered to be substantially impossible that DL/UL patterns in a plurality of different communication companies exactly match each other in one frame period. Thus, a case where DL/UL patterns do not match each other may be supposed, and there is the need to examine appropriate allocation of shared frequencies among base stations of a plurality of different communication companies. In a case where a carrier frequency allocated to each of base stations of a plurality of different communication companies is finely divided in order to reduce the occurrence of the interference among base stations, there is concern that a division loss may occur, and thus frequency use efficiency is reduced.

Therefore, in the following exemplary embodiments, a description will be made of a shared frequency management apparatus and a shared frequency management method capable of preventing the occurrence of interference that may normally occur among base stations when a carrier frequency of an RF band is shared by the base stations respectively installed by a plurality of different communication companies, and supporting realization of wireless communication satisfying a throughput required value.

Hereinafter, a detailed description will be made of exemplary embodiments in which a configuration and an operation of a shared frequency management apparatus and a shared frequency management method according to the present disclosure are specifically disclosed with reference to the drawings as appropriate. However, a detailed description more than necessary may be omitted. For example, a detailed description of a well-known content or a repeated description of a substantially identical configuration may be omitted. This is for a person skilled in the art's better understanding by avoiding unnecessary redundancy in the following description. The accompanying drawings and the following description are provided for a person skilled in the art to fully understand the present disclosure, and are not intended to limit the subject disclosed in the claims.

Exemplary Embodiment 1

Hereinafter, in wireless system 1 according to Exemplary Embodiment 1, a frequency band (hereinafter, referred to as a "shared frequency band") of which frequencies are shared in wireless communication in one or more base stations (hereinafter, referred to as "base stations") respectively installed by a plurality of different communication companies is, for example, 4.4 GHz to 5.0 GHz (the 4.6 GHz band or the 4.9 GHz band), 24.25 GHz to 29.5 GHz (the 26 GHz or the 28 GHz band), and 37 GHz to 42 GHz (38 GHz band) that may be candidate frequency bands in the fifth generation mobile communication system (5G). Each base station performs wireless communication with a terminal (which will be described later) that is a wireless communication destination accommodated therein according to a time division duplex (TDD) method (that is, a method in which an identical carrier frequency is allocated to an uplink (UL) and a downlink (DL) in a time division manner).

Figure 1:
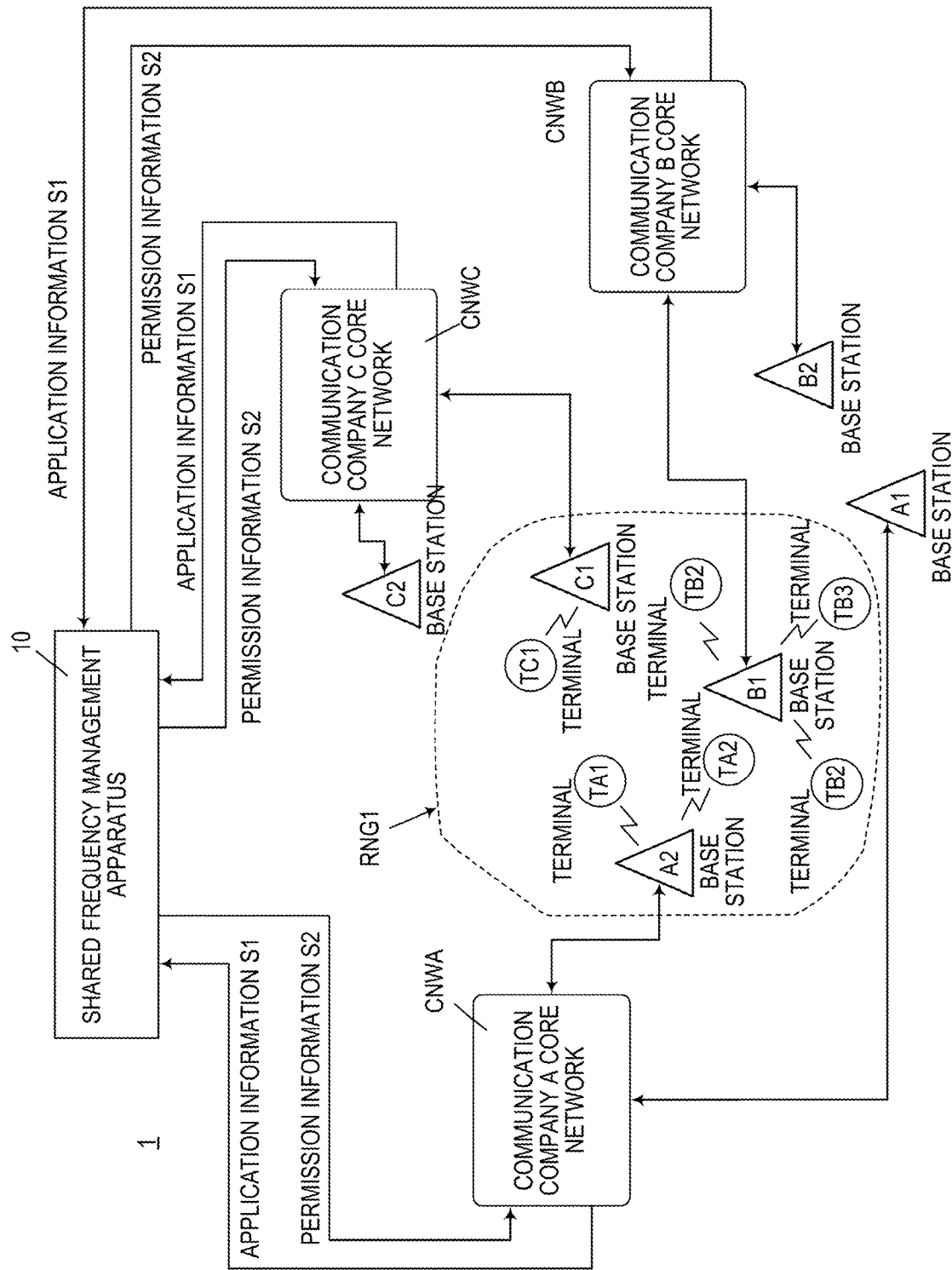
FIG. 1 is a block diagram illustrating a configuration example of a wireless system according to Exemplary Embodiment 1.

FIG. 1 is a block diagram illustrating a configuration example of wireless system 1 according to Exemplary Embodiment 1. Wireless system 1 is configured to include shared frequency management apparatus 10 and base stations A1, A2, B1, B2, C1, and C2 respectively installed by a plurality of different communication companies A, B, and C. In FIG. 1, for better understanding of a description of Exemplary Embodiment 1, the number of communication companies is three, and the number of base stations installed by each communication company is two.

Each of base stations A1 and A2 is installed by communication company A that applies for use of a carrier frequency of the shared frequency band, and can perform communication with shared frequency management apparatus 10 via communication company A core network CNWA. The communication may be wired communication using an optical fiber and may be wireless communication. Each of base stations A1 and A2 generates application information S1 (which will be described later) regarding use of a carrier frequency of the shared frequency band, and sends application information S1 to shared frequency management apparatus 10. Shared frequency management apparatus 10 generates permission information S2 in response to application information S1, and sends permission information S2 to each of base stations A1 and A2. Each of base stations A1 and A2 accommodates one or more terminals (for example, a smart phone, a tablet terminal, and a personal computer (PC)) that can perform wireless communication, and can perform wireless communication with the terminal according to the TDD method. For example, as illustrated in FIG. 1, base station A2 can perform wireless communication with each of terminals TA1 and TA2.

Each of base stations B1 and B2 is installed by communication company B that applies for use of a carrier frequency of the shared frequency band, and can perform communication with shared frequency management apparatus 10 via communication company B core network CNWB. The communication may be wired communication using an optical fiber and may be wireless communication. Each of base stations B1 and B2 generates application information S1 (which will be described later) regarding use of a carrier frequency of the shared frequency band, and sends application information S1 to shared frequency management apparatus 10. Shared frequency management apparatus 10 generates permission information S2 in response to application information S1, and sends permission information S2 to each of base stations B1 and B2. Each of base stations B1 and B2 accommodates one or more terminals (for example, a smart phone, a tablet terminal, and a personal computer (PC)) that can perform wireless communication, and can perform wireless communication with the terminal according to the TDD method. For example, as illustrated in FIG. 1, base station B1 can perform wireless communication with each of terminals TB1, TB2, and TB3.

Each of base stations C1 and C2 is installed by communication company C that applies for use of a carrier frequency of the shared frequency band, and can perform communication with shared frequency management apparatus 10 via communication company C core network CNWC. The communication may be wired communication using an optical fiber and may be wireless communication. Each of base stations C1 and C2 generates application information S1 (which will be described later) regarding use of a carrier frequency of the shared frequency band, and sends application information S1 to shared frequency management apparatus 10. Shared frequency management apparatus 10 generates permission information S2 in response to application information S1, and sends permission information S2 to each of base stations C1 and C2. Each of base stations C1 and C2 accommodates one or more terminals (for example, a smart phone, a tablet terminal, and a personal computer (PC)) that can perform wireless communication, and can perform wireless communication with the terminal according to the TDD method. For example, as illustrated in FIG. 1, base station C1 can perform wireless communication with terminal TC1.

Hereinafter, a description will be made of an example in which shared frequency management apparatus 10 allocates carrier frequencies of the shared frequency band to base stations A2, B1, and C1 such that inter-base station interference does not occur among base stations A2, B1, and C1 respectively installed by the plurality of different communication companies A, B, and C, present within predetermined distance range RNG1 illustrated in FIG. 1. Here, it is assumed that a distance between base station A2 and base station B1 is short, a distance between base station B1 and base station C1 is short, and a distance between base station A2 and base station C1 is long. As illustrated in FIG. 1, the number of base stations installed by each of communication companies A, B, and C is not limited to two, and may be one, and may be three or more.

Figure 2:
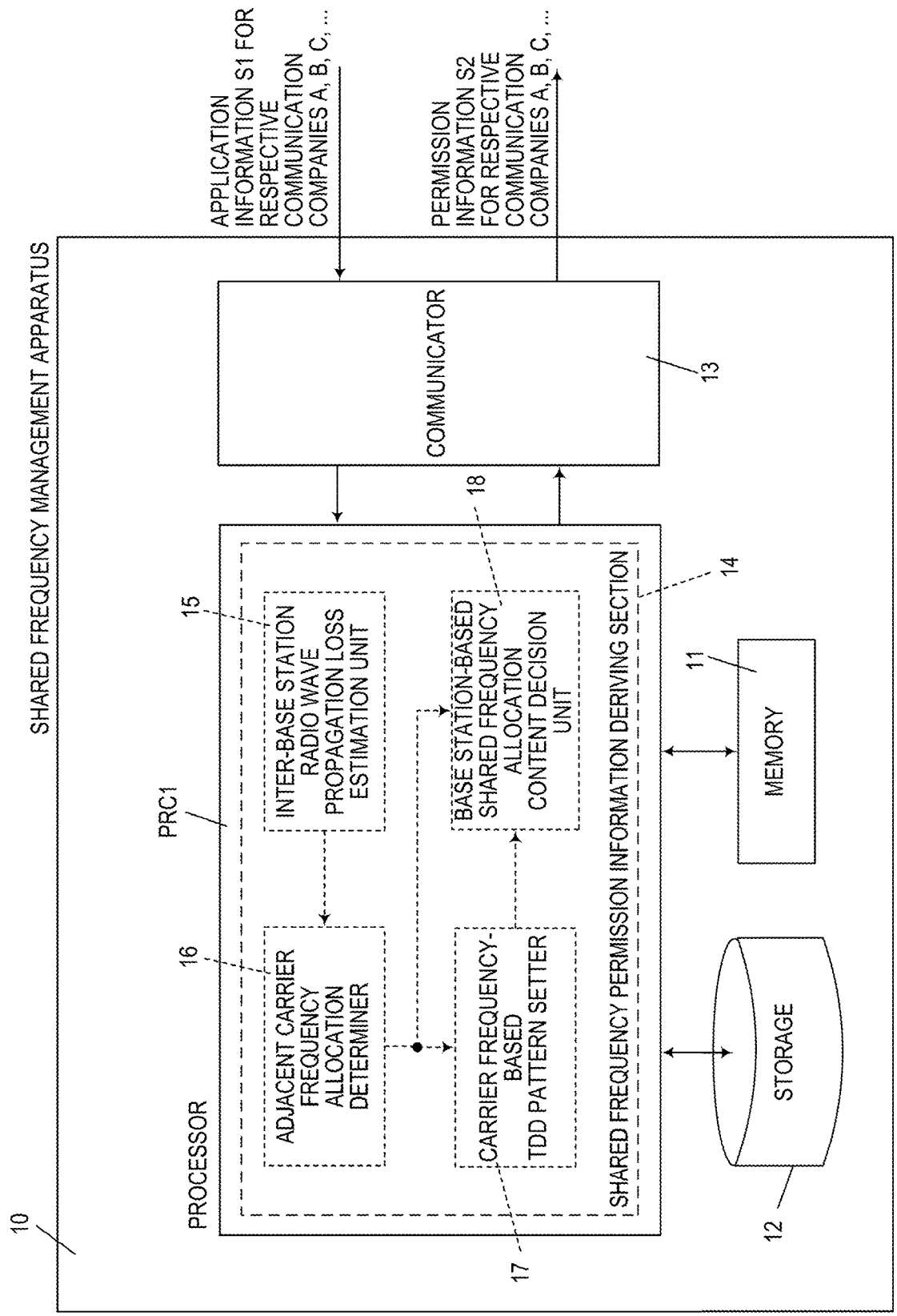
FIG. 2 is a block diagram illustrating an internal configuration example of a shared frequency management apparatus according to Exemplary Embodiment 1.

FIG. 2 is a block diagram illustrating an internal configuration example of shared frequency management apparatus 10 according to Exemplary Embodiment 1. Shared frequency management apparatus 10 is configured to include memory 11, storage 12, communicator 13, and processor PRC1, and is configured by, for example, a computer apparatus such as a server.

Shared frequency management apparatus 10 receives application information S1 sent from of base stations A1, A2, B1, B2, C1, and C2 respectively installed by the plurality of different communication companies A, B, and C. Application information S1 includes, for example, base station position information, a downlink (hereinafter, "DL") throughput required value, an uplink (hereinafter, "UL") throughput required value, and transmission power. Application information S1 may further include information indicating a traffic ratio (UL:DL) of a DL and a UL (hereinafter, "DL/UL"). For example, UL:DL=4:1 is appropriate for a configuration of a wireless communication system (a base station or a terminal accommodated in the base station; the same applies hereafter) in which a plurality of monitoring cameras are provided. UL:DL=1:8 is appropriate for a configuration of a wireless communication system in which content data is frequently downloaded, and UL:DL=1:1 is appropriate for a configuration of a wireless communication system in which bidirectional videos are frequently transmitted.

Shared frequency management apparatus 10 decides a content (refer to FIG. 8) of allocation of carrier frequencies of the shared frequency band to respective base stations A1, A2, B1, B2, C1, and C2 on the basis of application information S1 sent from each of base stations A1, A2, B1, B2, C1, and C2, and generates permission information S2 for each base station. Shared frequency management apparatus 10 sends generated permission information S2 for each base station to a corresponding base station.

Memory 11 is configured by using a random access memory (RAM) and a read only memory (ROM), and temporarily preserves a program required to execute an operation of shared frequency management apparatus 10, and further data or information generated during an operation. The RAM is, for example, a work memory used during an operation of processor PRC1. The ROM stores in advance a program for controlling, for example, processor PRC1. Memory 11 preserves, for example, information regarding carrier frequencies f1, f2, f3, and f4 (refer to FIG. 5) of the shared frequency band determined as being able to be allocated by shared frequency management apparatus 10. Memory 11 temporarily preserves, for example, application information S1 sent from each of base stations A1, A2, B1, B2, C1, and C2, or temporarily preserves permission information S2 to be sent to each of base stations A1, A2, B1, B2, C1, and C2.

Storage 12 is configured by using a hard disk drive (HDD) or a solid state drive (SSD), preserves information or data generated by processor PRC1, preserves application information S1 sent from each of base stations A1, A2, B1, B2, C1, and C2, or preserves permission information S2 to be sent to each of base stations A1, A2, B1, B2, C1, and C2.

Communicator 13 is configured by using a communication circuit performing transmission and reception of information or data with communication company A core network CNWA, communication company B core network CNWB, communication company C core network CNWC connected to shared frequency management apparatus 10. Communicator 13 performs transmission and reception of information or data with base stations A1 and A2, base stations B1 and B2, and base stations C1 and C2 via communication company A core network CNWA, communication company B core network CNWB, communication company C core network CNWC, respectively. For example, communicator 13 receives application information S1 sent from each of base stations A1, A2, B1, B2, C1, and C2, and sends permission information S2 for each base station to each of corresponding base stations A1, A2, B1, B2, C1, and C2.

Processor PRC1 is configured by using, for example, a central processing unit (CPU), a digital signal processor (DSP), or a field programmable gate array (FPGA). Processor PRC1 functions as a controller controlling an operation of shared frequency management apparatus 10, and performs a control process for totally controlling operations of the respective units of shared frequency management apparatus 10, data input and output processes among the respective units of shared frequency management apparatus 10, a data calculation (computation) process, and a data storage process. Processor PRC1 operates according to a program stored in memory 11. Processor PRC1 uses memory 11 during an operation, and stores data generated by processor PRC1 into memory 11. Processor PRC1 realizes a function of shared frequency permission information deriving section 14 by reading a program stored in memory 11 and executing the program.

Shared frequency permission information deriving section 14 is configured to include inter-base station radio wave propagation loss estimation unit 15, adjacent carrier frequency allocation determiner 16, carrier frequency-based TDD pattern setter 17, and base station-based shared frequency allocation content decision unit 18. Application information S1 sent from each of base stations A1, A2, B1, B2, C1, and C2 may be input to inter-base station radio wave propagation estimation unit 15, adjacent carrier frequency allocation determiner 16, carrier frequency-based TDD pattern setter 17, and base station-based shared frequency allocation content decision unit 18.

Inter-base station radio wave propagation loss estimation unit 15 as an example of a determiner estimates an inter-base station radio wave propagation loss amount on the basis of base station position information included in application information S1 sent from each of base stations A1, A2, B1, B2, C1, and C2. For example, inter-base station radio wave propagation loss estimation unit 15 estimates each radio wave propagation loss amount between base stations A2 and B1, between base stations A2 and C1, and between base stations B1 and C1. Inter-base station radio wave propagation loss estimation unit 15 sends an estimation result (in other words, base station interference level information) of each radio wave propagation loss amount between base stations A2 and B1, between base stations A2 and C1, and between base stations B1 and C1, to adjacent carrier frequency allocation determiner 16.

Adjacent carrier frequency allocation determiner 16 as an example of a determiner determines whether or not allocation of different TDD patterns (refer to FIG. 3) is possible (refer to FIG. 4) during the use of adjacent carrier frequencies among a plurality of carrier frequencies f1 to f4 (refer to FIG. 5) on the basis of the information regarding carrier frequencies f1 to f4 stored in memory 11 and the estimation results of the radio wave propagation loss amount between the base stations.

Here, the TDD pattern indicates uplink and downlink pattern (DL/UL pattern) of each carrier frequency in wireless communication based on the TDD method (refer to FIG. 3). FIG. 3 is a diagram illustrating examples of TDD patterns formed of an uplink and a downlink. TDD patterns P1, P2, and P3 illustrated in FIG. 3 may be preserved in memory 11 in advance, and may be generated by carrier frequency-based TDD pattern setter 17 every time.

For example, in a case where one frame is formed of 14 time slots, TDD pattern P1 indicates that the time slots respectively have "D, D, D, D, D, D, U, D, D, D, D, D, D, and U" (D:DL and U:UL). In other words, in TDD pattern P1, DL:UL=12:2 is obtained, and TDD pattern P1 is a pattern appropriate for a configuration of a wireless communication system (refer to the above description) in which content data is frequently downloaded.

In a case where one frame is formed of 14 time slots, TDD pattern P2 indicates that the time slots respectively have "D, D, D, D, U, U, U, D, D, D, U, U, U, and U". In other words, in TDD pattern P2, DL:UL=7:7 is obtained, and TDD pattern P2 is a pattern appropriate for a configuration of a wireless communication system (refer to the above description) in which bidirectional videos are frequently transmitted.

In a case where one frame is formed of 14 time slots, TDD pattern P3 indicates that the time slots respectively have "D, D, U, U, U, U, U, D, D, U, U, U, U, and U". In other words, in TDD pattern P3, DL:UL=4:10 is obtained, and TDD pattern P3 is a pattern appropriate for a configuration of a wireless communication system (refer to the above description) in which a plurality of monitoring cameras are provided.

Figures 5, 6, 7:
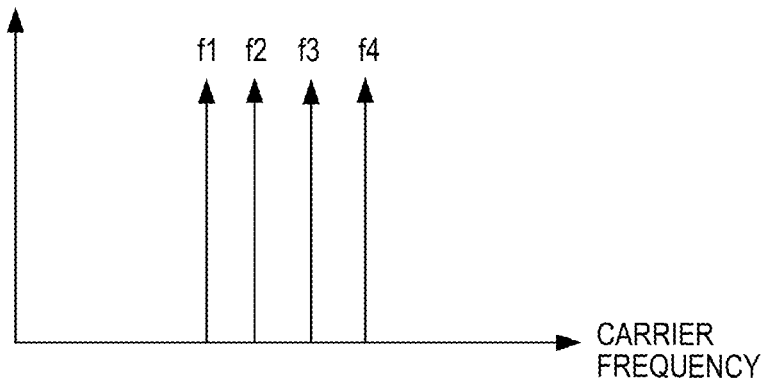
FIG. 5 is a diagram illustrating examples of carrier frequencies.
FIG. 6 is a table illustrating an example of a throughput required value for each of an uplink and a downlink, transmitted from each of the base stations of the three communication companies.
FIG. 7 is a table illustrating an example of a setting method regarding allocation of the TDD pattern to each carrier frequency.

FIG. 5 is a diagram illustrating an example of a carrier frequency. Regarding carrier frequencies f1 to f4 determined as being able to be allocated by shared frequency management apparatus 10, carrier frequencies f1 and f2 are adjacent to each other, carrier frequencies f2 and f3 are adjacent to each other, and carrier frequencies f3 and f4 are adjacent to each other. For better understanding of a description, in FIG. 5, the number of carrier frequencies is four, but is not limited thereto, and may be set according to a shared frequency band.

FIG. 4 is a table illustrating an example of whether or not allocation of a TDD pattern is possible when carrier frequencies are used in respective base stations of three communication companies. The table illustrated in FIG. 4 indicates whether or not allocation of an identical TDD pattern or different TDD patterns is possible when an identical carrier frequency is used in each of the set of base stations A2 and B1, the set of base stations A2 and C1, and the set of base stations B1 and C1. "O" in FIG. 4 indicates that allocation is possible, and "X" in FIG. 4 indicates that allocation is not possible.

Specifically, in a case where an identical carrier frequency (for example, carrier frequency f1) is used in each base station in order not to cause interference between base stations, an identical TDD pattern is required to be used except for a case where a distance between base stations is considerably long, and a radio wave propagation loss between the base stations is secured to be considerably large. Therefore, adjacent carrier frequency allocation determiner 16 determines that an identical TDD pattern is allocated in the use of an identical carrier frequency in all of the set of base stations A2 and B1, the set of base stations A2 and C1, and the set of base stations B1 and C1 with respect to base stations A2, B1, and C1 present in predetermined distance range RNG1.

In a case where adjacent carrier frequencies (for example, carrier frequencies f1 and f2) are used in each base station, the base station may be influenced by a radio wave propagation loss depending on a distance between base stations. For example, since a distance between base stations A2 and B1 and a distance between base stations B1 and C1 are short, there is a high probability that a radio wave propagation loss is not sufficiently large, and thus interference may occur. Therefore, adjacent carrier frequency allocation determiner 16 determines that different TDD patterns are not permitted to be used in the use of the adjacent carrier frequencies in the set of base stations A2 and B1 and the set of base stations B1 and C1. On the other hand, since a distance between base stations A2 and C1 is long, a radio wave propagation loss may be sufficiently large, and thus there is a low probability that interference may occur. Therefore, adjacent carrier frequency allocation determiner 16 determines that different TDD patterns are permitted to be used in the use of the adjacent carrier frequencies in the set of base stations A2 and C1.

In a case where non-adjacent carrier frequencies (for example, carrier frequencies f1 and f3) are used in each base station, interference may hardly occur between base stations regardless of a distance between base stations. Therefore, adjacent carrier frequency allocation determiner 16 determines that different TDD patterns are permitted to be used in all of the set of base stations A2 and B1, the set of base stations A2 and C1, and the set of base stations B1 and C1.

Carrier frequency-based TDD pattern setter 17 as an example of a setter sets a TDD pattern for each carrier frequency (refer to FIG. 7) on the basis of the downlink throughput required value and the uplink throughput required value (refer to FIG. 6) included in application information S1 sent from each of base stations A1, A2, B1, B2, C1, and C2, an estimation result of a radio wave propagation loss amount between base stations, and a determination result (refer to FIG. 4) of whether or not allocation of different TDD patterns is possible during the use of adjacent carrier frequencies. Details of an example of setting a TDD pattern for each carrier frequency will be described later.

Base station-based shared frequency allocation content decision unit 18 as an example of a decision unit receives the downlink throughput required value and the uplink throughput required value (refer to FIG. 6) included in application information S1 sent from each of base stations A1, A2, B1, B2, C1, and C2, a determination result (refer to FIG. 4) of whether or not allocation of different TDD patterns is possible during the use of adjacent carrier frequencies, and a setting result (refer to FIG. 7) of a TDD pattern for each carrier frequency. Base station-based shared frequency allocation content decision unit 18 decides an allocation content (refer to FIG. 8) of a shared frequency band to each base station, satisfying (in other words, permitted to be used) application information S1 from each base station on the basis of the received information. In a case where there are a plurality of carrier frequencies permitted to be used, base station-based shared frequency allocation content decision unit 18 preferably gives such a priority order that use priority orders for the carrier frequencies scatter among base stations. Base station-based shared frequency allocation content decision unit 18 generates permission information S2 including the decided allocation content of the shared frequency band, and sends the permission information S2 to communicator 13. Permission information S2 includes, for example, information regarding at least one carrier frequency of the shared frequency band permitted to be used, a priority order regarding the use of the carrier frequency, and an upper limit value of transmission power.

Next, with reference to FIGS. 6 to 8, descriptions will be made of an example of setting a TDD pattern for each carrier frequency and an example of deciding an allocation content of a shared frequency band to each base station (refer to FIG. 8) when a carrier frequency is supposed to be allocated to each of base stations A2, B1, and C1 present in predetermined distance range RNG1. FIG. 6 is a table illustrating an example of a throughput required value for each of an uplink and a downlink, transmitted from each of the base stations of the three communication companies. FIG. 7 is a table illustrating an example of a setting method regarding allocation of the TDD pattern to each carrier frequency. FIG. 8 is a table illustrating an example of a throughput calculated value for each of an uplink and a downlink corresponding to each setting method in FIG. 7.

As illustrated in FIG. 6, application information S1 from base station A2 includes 5 Gbps as a DL throughput required value and 1 Gbps as a UL throughput required value. Application information S1 from base station B1 includes 10 Gbps as a DL throughput required value and 1 Gbps as a UL throughput required value. Application information S1 from base station C1 includes 5 Gbps as a DL throughput required value and 8 Gbps as a UL throughput required value. Application information S1 is temporarily preserved in, for example, memory 11.

The following conditions are assumed and will be described for better understanding of descriptions as a basis of descriptions of FIGS. 7 and 8.

(Condition 1) Application of use of a carrier frequency of a shared frequency band is performed by a total of three base stations such as base stations A2, B1, and C1 respectively installed by the plurality of different communication companies A, B, and C.

(Condition 2) There are four carrier frequencies (refer to FIG. 5), a throughput of about 14 Gbps is expected per carrier frequency.

(Condition 3) There are three TDD patterns (refer to FIG. 3).

(Condition 4) The determination result illustrated in FIG. 4 is used for a determination example of whether or not allocation of different TDD patterns (refer to FIG. 3) is possible during the use of adjacent carrier frequencies among the plurality of carrier frequencies f1 to f4 (refer to FIG. 5).

Carrier frequency-based TDD pattern setter 17 calculates a total of downlinks (TDL) and a total of uplinks (TUL) according to Equations (1) and (2) by using the downlink throughput required value and the uplink throughput required value (refer to FIG. 6) included in application information S1 sent from each of base stations A1, A2, B1, B2, C1, and C2. In Equations (1) and (2), DL(k) indicates a DL throughput required value included in application information S1 from a base station of communication company k, and UL(k) indicates a UL throughput required value included in application information S1 from the base station of communication company k.

$$TDL = \sum_{k=1}^{N}(DL(k)) \quad (1)$$

$$TUL = \sum_{k=1}^{N}(UL(k)) \quad (2)$$

When the numbers of carrier frequencies respectively using TDD patterns P1, P2, and P3 are n1, n2, and n3, carrier frequency-based TDD pattern setter 17 decides n1, n2, and n3 such that a ratio of wireless resources between a downlink (DL) and an uplink (UL) is substantially the same as TDL/TUL (refer to Equation (3)). Here, for convenience, n=(n1+n2+n3) is set.

$$\frac{TDL}{TUL} \cong \frac{12n1 + 7n2 + 4n3}{2n1 + 7n2 + 10n3} = r \quad (3)$$

Here, a description will be made of two simple examples of deriving parameters n1, n2, and n3 indicating the number of carrier frequencies. Herein, the description will be made by using numerical value examples that are different from the numerical values (condition 2) assumed in the description of an operation of carrier frequency-based TDD pattern setter 17.

Derivint Example 1

For example, in a case where TDL=4 Gbps, TUL=1 Gbps, and n (=n1+n2+n3)=10, Equation (3) becomes 4/1=(12n1+7n2+4n3)/(2n1+7n2+10n3).

Carrier frequency-based TDD pattern setter 17 exemplifies (n1, n2, n3)=(9, 0, 1) as setting method #1 in order to satisfy Equation (3) to which the specific numerical values are assigned, and may thus obtain r (refer to Equation (3))=4.0. Similarly, carrier frequency-based TDD pattern setter 17 exemplifies (n1, n2, n3)=(8, 2, 0) as setting method #2, and may thus obtain r (refer to Equation (3))≅3.7. Similarly, carrier frequency-based TDD pattern setter 17 exemplifies (n1, n2, n3)=(8, 1, 1) as setting method #3, and may thus obtain r (refer to Equation (3))≅3.2.

Deriving Example 2

For example, in a case where TDL=1 Gbps, TUL=2 Gbps, and n (=n1+n2+n3)=8, Equation (3) becomes 1/2=(0.50)=(12n1+7n2+4n3)/(2n1+7n2+10n3).

Carrier frequency-based TDD pattern setter 17 exemplifies (n1, n2, n3)=(0, 2, 6) as setting method #1 in order to satisfy Equation (3) to which the specific numerical values are assigned, and may thus obtain r (refer to Equation (3))≅0.51. Similarly, carrier frequency-based TDD pattern setter 17 exemplifies (n1, n2, n3)=(0, 3, 5) as setting method #2, and may thus obtain r (refer to Equation (3))≅0.58.

According to deriving examples 1 and 2, since TDL=20 (=5+10+5) and TUL=10(=1+8+1) from FIG. 6, and (n1+n2+n3)=4 from the above assumption are set, carrier frequency-based TDD pattern setter 17 derives setting methods #1, #2, and #3 for a TDD pattern satisfying 20/10 (=2)=(12n1+7n2+4n3)/(2n1+7n2+10n3) by assigning specific numerical values to Equation (3).

For example, carrier frequency-based TDD pattern setter 17 derives (n1, n2, n3)=(2, 2, 0) and r=38/18≅2.1 as setting method #1 for a TDD pattern. Carrier frequency-based TDD pattern setter 17 derives (n1, n2, n3)=(3, 0, 1) and r=40/16≅2.5 as setting method #2 for a TDD pattern. Carrier frequency-based TDD pattern setter 17 derives (n1, n2, n3)=(2, 1, 1) and r=35/21≅1.7 as setting method #3 for a TDD pattern.

Carrier frequency-based TDD pattern setter 17 sets setting methods #1, #2, and #3 for a TDD pattern for each carrier frequency illustrated in FIG. 7 on the basis of the deriving examples (that is, a combination of n1, n2, and n3) of setting methods #1, #2, and #3 for a TDD pattern and the determination result (refer to FIG. 5) of whether or not allocation of different TDD patterns is possible during the use of adjacent carrier frequencies. As described above, the numbers of carrier frequencies respectively using TDD patterns P1, P2, and P3 are defined as n1, n2, and n3.

Therefore, in setting method #1 for a TDD pattern, when (n1, n2, n3) is (2, 2, 0), and carrier frequencies (f1, f2, f3, f4) are used, TDD pattern P1 is set for carrier frequency f1, TDD pattern P1 is set for carrier frequency f2, TDD pattern P2 is set for carrier frequency f3, and TDD pattern P2 is set for carrier frequency f4 (that is, (f1, f2, f3, f4)=(P1, P1, P2, P2)). This is because, in a case where TDD pattern setting method #1 is set, carrier frequency-based TDD pattern setter 17 reduces allocation of different TDD patterns as much as possible during the use of adjacent carrier frequencies according to a prohibition content (specifically, refer to the "X" mark in FIG. 4) when different TDD patterns are allocated during the use of the adjacent carrier frequencies by referring to the determination result (FIG. 4) of whether or not allocation of different TDD patterns is possible. Therefore, carrier frequency-based TDD pattern setter 17 sets (f1, f2, f3, f4)=(P1, P1, P2, P2) instead of (f1, f2, f3, f4)=(P1, P2, P2, P1). This is also the same for setting of setting methods #2 and #3.

In setting method #2 for a TDD pattern, when (n1, n2, n3) is (3, 0, 1), and carrier frequencies (f1, f2, f3, f4) are used, TDD pattern P1 is set for carrier frequency f1, TDD pattern P1 is set for carrier frequency f2, TDD pattern P1 is set for carrier frequency f3, and TDD pattern P3 is set for carrier frequency f4.

In setting method #3 for a TDD pattern, when (n1, n2, n3) is (2, 1, 1), and carrier frequencies (f1, f2, f3, f4) are used, TDD pattern P2 is set for carrier frequency f1, TDD pattern P1 is set for carrier frequency f2, TDD pattern P1 is set for carrier frequency f3, and TDD pattern P3 is set for carrier frequency f4.

Base station-based shared frequency allocation content decision unit 18 calculates a DL throughput and a UL throughput when a corresponding carrier frequency is used, for each of base stations A2, B1, and C1, by using the setting results (that is, refer to setting methods #1, #2, and #3 for a TDD pattern illustrated in FIG. 7) of a TDD pattern for each carrier frequency. When the DL throughput and the UL throughput are calculated, allocation of different TDD patterns is not performed when adjacent carrier frequencies are used in different base stations (for example, base stations A2 and B1), and, thus, for example, carrier frequencies f2 and f3 are not allocated to base station B1.

Example of Calculating DL Throughput and UL Throughput Corresponding to TDD Pattern Setting Method #1

Base station-based shared frequency allocation content decision unit 18 calculates a DL throughput and a UL throughput as follows in a case where TDD patterns (P1, P1, P2, P2) are allocated to carrier frequencies (f1, f2, f3, f4) in base station A2 on the basis of the determination result (refer to FIG. 4) of whether or not allocation of different TDD patterns is possible during the use of adjacent carrier frequencies. Specifically, a DL throughput calculated value is "12×(5/20)"+"12×(5/10)"+"7×(5/10)"+"7×(5/20)"=14.25. A UL throughput calculated value is "2×(1/10)"+"2×(1/9)"+"7×(1/9)"+"7×(1/10)"=1.90.

Base station-based shared frequency allocation content decision unit 18 calculates a DL throughput and a UL throughput as follows in a case where TDD patterns (P1, P1, P2, P2) are allocated to carrier frequencies (f1, f2, f3, f4) in base station B1 on the basis of the determination result (refer to FIG. 4) of whether or not allocation of different TDD patterns is possible during the use of adjacent carrier frequencies. Specifically, a DL throughput calculated value is "12×(10/20)"+"0"+"0"+"7×(10/20)"=9.50. A UL throughput calculated value is "2×(1/10)"+"0"+"0"+"7×(1/10)"=0.90.

Base station-based shared frequency allocation content decision unit 18 calculates a DL throughput and a UL throughput as follows in a case where TDD patterns (P1, P1, P2, P2) are allocated to carrier frequencies (f1, f2, f3, f4) in base station C1 on the basis of the determination result (refer to FIG. 4) of whether or not allocation of different TDD patterns is possible during the use of adjacent carrier frequencies. Specifically, a DL throughput calculated value is "12×(5/20)"+"12×(5/10)"+"7×(5/10)"+"7×(5/20)"=14.25. A UL throughput calculated value is "2×(8/10)"+"2×(8/9)"+"7×(8/9)"+"7×(8/10)"=15.20.

Example of Calculating DL Throughput and UL Throughput Corresponding to TDD Pattern Setting Method #2

Base station-based shared frequency allocation content decision unit 18 calculates a DL throughput and a UL throughput as follows in a case where TDD patterns (P1, P1, P1, P3) are allocated to carrier frequencies (f1, f2, f3, f4) in base station A2 on the basis of the determination result (refer to FIG. 4) of whether or not allocation of different TDD patterns is possible during the use of adjacent carrier frequencies. Specifically, a DL throughput calculated value is "12×(5/20)"+"12×(5/20)"+"12×(5/10)"+"4×(5/10)"=14.00. A UL throughput calculated value is "2×(1/10)"+"2×(1/10)"+"2×(1/9)"+"10×(1/9)"=1.73.

Base station-based shared frequency allocation content decision unit 18 calculates a DL throughput and a UL throughput as follows in a case where TDD patterns (P1, P1, P1, P3) are allocated to carrier frequencies (f1, f2, f3, f4) in base station B1 on the basis of the determination result (refer to FIG. 4) of whether or not allocation of different TDD patterns is possible during the use of adjacent carrier frequencies. Specifically, a DL throughput calculated value is "12×(10/20)"+"12×(10/20)"+"0"+"0"=12.00. A UL throughput calculated value is "2×(1/10)"+"2×(1/10)"+"0"+"0"=0.40.

Base station-based shared frequency allocation content decision unit 18 calculates a DL throughput and a UL throughput as follows in a case where TDD patterns (P1, P1, P1, P3) are allocated to carrier frequencies (f1, f2, f3, f4) in base station C1 on the basis of the determination result (refer to FIG. 4) of whether or not allocation of different TDD patterns is possible during the use of adjacent carrier frequencies. Specifically, a DL throughput calculated value is "12×(5/20)"+"12×(5/20)"+"12×(5/10)"+"4×(5/10)"=14.00. A UL throughput calculated value is "2×(8/10)"+"2×(8/10)"+"2×(8/9)"+"10×(8/9)"=13.87.

Example of Calculating DL Throughput and UL Throughput Corresponding to TDD Pattern Setting Method #3

Base station-based shared frequency allocation content decision unit 18 calculates a DL throughput and a UL throughput as follows in a case where TDD patterns (P2, P1, P1, P3) are allocated to carrier frequencies (f1, f2, f3, f4) in base station A2 on the basis of the determination result (refer to FIG. 4) of whether or not allocation of different TDD patterns is possible during the use of adjacent carrier frequencies. Specifically, a DL throughput calculated value is "7×(5/10)"+"12×(5/10)"+"0"+"0"=9.50. A UL throughput calculated value is "7×(1/9)"+"2×(1/9)"+"0"+"0"=1.00.

Base station-based shared frequency allocation content decision unit 18 calculates a DL throughput and a UL throughput as follows in a case where TDD patterns (P2, P1, P1, P3) are allocated to carrier frequencies (f1, f2, f3, f4) in base station B1 on the basis of the determination result (refer to FIG. 4) of whether or not allocation of different TDD patterns is possible during the use of adjacent carrier frequencies. Specifically, a DL throughput calculated value is "0"+"0"+"12×(10/10)"+"4×(10/10)"=16.00. A UL throughput calculated value is "0"+"0"+"2×(1/1)"+"10×(1/1)"=12.00.

Base station-based shared frequency allocation content decision unit 18 calculates a DL throughput and a UL throughput as follows in a case where TDD patterns (P2, P1, P1, P3) are allocated to carrier frequencies (f1, f2, f3, f4) in base station C1 on the basis of the determination result (refer to FIG. 4) of whether or not allocation of different TDD patterns is possible during the use of adjacent carrier frequencies. Specifically, a DL throughput calculated value is "7×(5/10)"+"12×(5/10)"+"0"+"0"=9.50. A UL throughput calculated value is "7×(8/9)"+"2×(8/9)"+"0"+"0"=8.00.

Base station-based shared frequency allocation content decision unit 18 compares (refer to FIG. 9) the DL throughput calculated value and the UL throughput calculated value that are calculated with the DL throughput required value and the UL throughput required value (refer to FIG. 6) included in application information S1 from each of base stations A2, B1, and C1 by referring to FIG. 8, and thus decides a content (refer to FIG. 8) of allocation of a shared frequency band to each base station, satisfying application information S1 from each base station (in other words, maximally corresponding to the demand for a throughput required value). FIG. 9 is a diagram illustrating an example of deciding a throughput calculated value satisfying a throughput required value with the largest margin.

In FIG. 9, table TBL1 indicates a DL throughput required value and a UL throughput required value for each of base stations A2, B1, and C1. Table TBL2 indicates a DL throughput calculated value and a UL throughput calculated value (refer to FIG. 8) for each of base stations A2, B1, and C1, calculated in correspondence with TDD pattern setting method #1. Table TBL3 indicates a DL throughput calculated value and a UL throughput calculated value (refer to FIG. 8) for each of base stations A2, B1, and C1, calculated in correspondence with TDD pattern setting method #2. Table TBL4 indicates a DL throughput calculated value and a UL throughput calculated value (refer to FIG. 8) for each of base stations A2, B1, and C1, calculated in correspondence with TDD pattern setting method #3.

Base station-based shared frequency allocation content decision unit 18 retrieves which table satisfies a content of table TBL1 with the largest margin among tables TBL2, TBL3, and TBL4. Here, the phrase "satisfying with the largest margin" indicates that a (maximum) throughput calculated value (for example, a throughput calculated value of 200%) greater than a throughput calculated value of 80% or 150% in a case where obtaining the same throughput calculated value as a throughput required value indicates that a margin degree of 100% is obtained.

Specifically, base station-based shared frequency allocation content decision unit 18 selects a TDD pattern setting method in which the number of DL throughput calculated values or UL throughput calculated values smaller than a DL throughput required value and a UL throughput required value for each of base stations A2, B1, and C1 is smallest. In the example illustrated in FIG. 9, base station-based shared frequency allocation content decision unit 18 selects an allocation content of a carrier frequency corresponding to TDD pattern setting method #1 or TDD pattern setting method #3. This is because, when compared with a DL throughput required value and a UL throughput required value (refer to table TBL1) for each of base stations A2, B1, and C1, the DL throughput calculated values and the UL throughput calculated values in table TBL2 are considerably smaller (that is, the UL throughput calculated value is 0.40 Gbps compared with 1 Gbps that is the UL throughput required value for base station B1).

Therefore, base station-based shared frequency allocation content decision unit 18 decides allocation content #1 of carrier frequencies of the shared frequency band to base stations A2, B1, and C1 (that is, with respect to base station A2, (P1, P1, P2, P2) are respectively allocated to (f1, f2, f3, f4), with respect to base station B1, (P1, P2) are respectively allocated to (f1, f4), and, with respect to base station C1, (P1, P1, P2, P2) are respectively allocated to (f1, f2, f3, f4)), and generates permission information S2 including allocation content #1. Alternatively, base station-based shared frequency allocation content decision unit 18 decides allocation content #3 of carrier frequencies of the shared frequency band to base stations A2, B1, and C1 (that is, with respect to base station A2, (P2, P1) are respectively allocated to (f1, f2), with respect to base station B1, (P1, P3) are respectively allocated to (f3, f4), and, with respect to base station C1, (P2, P1) are respectively allocated to (f1, f2)), and generates permission information S2 including allocation content #3.

Next, with reference to FIG. 10, a description will be made of examples of operation procedures of wireless system 1 according to Exemplary Embodiment 1. FIG. 10 is a sequence diagram illustrating operation procedure examples of wireless system 1 according to Exemplary Embodiment 1. As base stations of communication companies A, B, and C illustrated in FIG. 10, base stations A2, B1, and C1 illustrated in FIG. 1 are exemplified.

In FIG. 10, each of base stations A2, B1, and C1 generates application information S1, and transmits application information S1 to shared frequency management apparatus 10 (St1). Shared frequency management apparatus 10 estimates an inter-base station radio wave propagation loss amount on the basis of base station position information included in application information S1 sent from each of base stations A2, B1, and C1 (St2). In step St2, in a case where measurement results of radio wave propagation loss amounts among base stations A2, B1, and C1 are preserved in advance in memory 11, the measurement results (actually measured values) may be used.

Shared frequency management apparatus 10 determines whether or not allocation (condition 1) of different TDD patterns (refer to FIG. 3) is possible during the use of adjacent carrier frequencies among a plurality of carrier frequencies f1 to f4 (refer to FIG. 5) on the basis of information regarding carrier frequencies f1 to f4 preserved in memory 11 and estimation results of inter-base station radio wave propagation loss amounts (St3). Shared frequency management apparatus 10 acquires a downlink throughput required value and an uplink throughput required value (condition 2) from application information S1 sent from each of base stations A2, B1, and C1 (St4).

Shared frequency management apparatus 10 sets TDD pattern setting methods #1, #2, and #3 for each carrier frequency by taking into consideration ratio r (refer to Equation (3)) between the DL throughput required value and the UL throughput required value (St5). Shared frequency management apparatus 10 retrieves, from TDD pattern setting methods #1 to #3, an allocation content satisfying the throughput required value in condition 2 in step St4 with the largest margin from among allocation contents of carrier frequencies to base stations A2, B1, and C1, satisfying condition 1 in step St3 (St6). Shared frequency management apparatus 10 decides an allocation content satisfying the throughput required value with the largest margin as a retrieval result in step St6 (St7). Process examples in steps St6 and St7 have been described with reference to FIGS. 6 to 8, and thus detailed descriptions thereof will be omitted.

Shared frequency management apparatus 10 gives a use priority order that use priority orders for shared frequencies to be allocated scatter in nearby base stations (that is, installed at positions close to each other to the extent to which interference is mutually given) (for example, between base stations A2 and B1) (St8). This is so that segregation of a carrier frequency at which interference between a base station and a terminal is minimized is easily performed in an autonomously distributed manner. Shared frequency management apparatus 10 gives the use priority order, and generates permission information S2 including the allocation content of carrier frequencies of a shared frequency band to respective base stations A2, B1, and C1 for each of corresponding base stations A2, B1, and C1 (St8). Shared frequency management apparatus 10 transmits permission information S2 to each of corresponding base stations A2, B1, and C1 (St9).

Each of base stations A2, B1, and C1 sequentially uses a carrier frequency included in permission information S2 sent from shared frequency management apparatus 10 in a higher use priority order, and tries to perform wireless communication with one or more accommodated terminals (St10).

As mentioned above, in wireless system 1 according to Exemplary Embodiment 1, shared frequency management apparatus 10 causes communicator 13 to receive application information S1 regarding the use of a shared frequency band from each of base stations A2, B1, and C1 of a plurality of different communication companies. Shared frequency management apparatus 10 causes processor PRC1 to determine whether or not allocation of different TDD patterns is possible during the use of adjacent carrier frequencies among a plurality of carrier frequencies f1 to f4 included in the shared frequency band on the basis of application information S1 from each of base stations A2, B1, and C1. Shared frequency management apparatus 10 causes processor PRC1 to set a TDD pattern for each carrier frequency on the basis of application information S1 from each of base stations A2, B1, and C1 and a determination result of whether or not allocation of different TDD patterns is possible. Shared frequency management apparatus 10 causes processor PRC1 to decide an allocation content of the shared frequency band to each of base stations A2, B1, and C1, satisfying application information S1 from each of base stations A2, B1, and C1 on the basis of a result of setting a TDD pattern for each carrier frequency.

Consequently, shared frequency management apparatus 10 can prevent the occurrence of interference that may normally occur among the base stations when carrier frequencies of a radio frequency band are shared by base stations A2, B1, and C1 respectively installed by a plurality of different communication companies A, B, and C. Therefore, shared frequency management apparatus 10 can support realization of wireless communication satisfying a throughput required value included in application information S1 from base stations A2, B1, and C1.

Shared frequency management apparatus 10 notifies corresponding base stations A2, B1, and C1 of decision results of allocation contents of the shared frequency band to respective base stations A2, B1, and C1. Consequently, base stations A2, B1, and C1 can acquire information regarding carrier frequencies of the shared frequency band permitted for base stations A2, B1, and C1, and can thus start wireless communication with one or more terminals accommodated therein.

Application information S1 from each of base stations A2, B1, and C1 includes position information of corresponding base stations A2, B1, and C1. Shared frequency management apparatus 10 determines whether or not allocation of different TDD patterns for each of base stations A2, B1, and C1 is possible on the basis of the position information of each of base stations A2, B1, and C1. Consequently, shared frequency management apparatus 10 can appropriately determine, for each base station, whether or not different TDD patterns are to be allocated during the use of adjacent carrier frequencies at which interference easily occurs by taking into consideration base station position information.

Application information S1 from each of base stations A2, B1, and C1 includes position information of corresponding base stations A2, B1, and C1. Shared frequency management apparatus 10 estimates an inter-base station radio wave propagation loss by using the position information of each of base stations A2, B1, and C1, and determines whether or not allocation of different TDD patterns for each base station is possible on the basis of a result of estimation of the inter-base station radio wave propagation loss. Consequently, shared frequency management apparatus 10 can appropriately determine, for each base station, whether or not different TDD patterns are to be allocated during the use of adjacent carrier frequencies at which interference easily occurs by taking into consideration an inter-base station radio wave propagation loss amount based on base station position information.

Application information S1 from each of base stations A2, B1, and C1 includes an uplink throughput required value and a downlink throughput required value during wireless communication of a corresponding base station. Shared frequency management apparatus 10 sets a TDD pattern for each carrier frequency on the basis of a ratio between the uplink throughput required value and the downlink throughput required value, and a determination result of whether or not allocation of adjacent carrier frequencies is possible. Consequently, shared frequency management apparatus 10 can generate a combination of set TDD patterns such that allocation of different TDD patterns can be reduced for each carrier frequency while satisfying a DL throughput required value and a UL throughput required value from each of base stations A2, B1, and C1.

Shared frequency management apparatus 10 calculates an uplink throughput and a downlink throughput based on allocation of carrier frequencies of a shared frequency band to each of base stations A2, B1, and C1 by using a result of setting a TDD pattern for each carrier frequency. Shared frequency management apparatus 10 decides an allocation content of the shared frequency band to each of base stations A2, B1, and C1 according to comparison between an uplink throughput calculated value and a downlink throughput calculated value, and the uplink throughput required value and the downlink throughput required value. Consequently, shared frequency management apparatus 10 can derive an allocation content for a TDD pattern in which an uplink throughput calculated value and a downlink throughput calculated value not smaller than an uplink throughput required value and a downlink throughput required value from each of base stations A2, B1, and C1 are obtained.

As mentioned above, the exemplary embodiments have been described with reference to the accompanying drawings, but the present disclosure is not limited to these embodiments. It is obvious that a person skilled in the art can conceive of various changes, modifications, replacements, additions, deletions, and equivalents within the category disclosed in the claims, and it is understood that they are also included in the technical scope of the present disclosure. Any combination of the respective constituent elements in the exemplary embodiments may occur within the scope without departing from the concept of the disclosure.

The present disclosure is useful as a shared frequency management apparatus and a shared frequency management method capable of preventing the occurrence of interference that may normally occur among base stations when a carrier frequency of an RF band is shared by the base stations respectively installed by a plurality of different communication companies, and supporting realization of wireless communication satisfying a throughput required value.

What is claimed is:

1. A shared frequency management apparatus comprising:
a communicator that receives application information regarding use of a shared frequency band from each of base stations of a plurality of different communication companies, wherein the application information from each base station includes: (i) base station position information, (ii) an uplink throughput required value, and (iii) a downlink throughput required value; and
processing circuitry, which is coupled to the communicator and which, in operation,
performs a determination process of determining whether or not allocation of two different time division duplex (TDD) patterns to two of the base stations, to which two adjacent carrier frequencies among a plurality of carrier frequencies included in the shared frequency band are assigned, is possible based on an estimated probability of interference between the two base stations calculated from the base station position information of the two base stations;
performs an allocation process of configuring a TDD pattern setting method, in which TDD patterns including the two different TDD patterns are allocated to the plurality of carrier frequencies based at least on a determination result of the determination process;
repeats the allocation process to configure at least two different TDD pattern setting methods, wherein in each of the at least two different TDD pattern setting methods, first and second carrier frequencies of the plurality of carrier frequencies usable by the two base stations are assigned use priority orders in a scattered manner, the two base stations consisting of a first base station and a second base station, such that the first carrier frequency is assigned a higher use priority order for the first base station and assigned a lower use priority order for the second base station, and the second carrier frequency is assigned a lower use priority order for the first base station and assigned a higher use priority order for the second base station; and
selects one TDD pattern setting method, out of the at least two different TDD pattern setting methods, which maximally satisfies the uplink throughput required values and the downlink throughput required values of the base stations.

2. The shared frequency management apparatus of claim 1,
wherein the communicator notifies the base stations of the selected TDD pattern setting method.

3. The shared frequency management apparatus of claim 1,
wherein the processing circuitry estimates an inter-base station radio wave propagation loss by using the base station position information, and calculates the estimated probability of interference based on the estimated inter-base station radio wave propagation loss.

4. The shared frequency management apparatus of claim 1,
wherein the processing circuitry, in each of the TDD pattern setting methods, calculates an uplink throughput value and a downlink throughput value of each of the base stations, and compares the uplink throughput values and the downlink throughput values calculated for the base stations with the uplink throughput required values and the downlink throughput required values of the base stations.

5. A shared frequency management method executed by a shared frequency management apparatus, the method comprising:
receiving application information regarding use of a shared frequency band from each of base stations of a plurality of different communication companies, wherein the application information from each base station includes: (i) base station position information, (ii) an uplink throughput required value, and (iii) a downlink throughput required value;
determining whether or not allocation of two different time division duplex (TDD) patterns to two of the base stations, to which two adjacent carrier frequencies among a plurality of carrier frequencies included in the shared frequency band are assigned, is possible based on an estimated probability of interference between the two base stations calculated from the base station position information of the two base stations;
configuring a TDD pattern setting method, in which TDD patterns including the two different TDD patterns are allocated to the plurality of carrier frequencies based at least on a determination result of the determining step;
repeating the configuring step to configure at least two different TDD pattern setting methods, wherein in each of the at least two different TDD pattern setting methods, first and second carrier frequencies of the plurality of carrier frequencies usable by the two base stations are assigned use priority orders in a scattered manner, the two base stations consisting of a first base station and a second base station, such that the first carrier frequency is assigned a higher use priority order for the first base station and assigned a lower use priority order for the second base station, and the second carrier frequency is assigned a lower use priority order for the first base station and assigned a higher use priority order for the second base station; and
selecting one TDD pattern setting method, out of the at least two different TDD pattern setting methods, which maximally satisfies the uplink throughput required values and the downlink throughput required values of the base stations.

6. The shared frequency management method of claim 5, comprising:
   notifying the base stations of the selected TDD pattern setting method.

7. The shared frequency management method of claim 5, comprising:
   estimating an inter-base station radio wave propagation loss by using the base station position information, and calculating the estimated probability of interference based on the estimated inter-base station radio wave propagation loss.

8. The shared frequency management method of claim 5, comprising:
   in each of the TDD pattern setting methods, calculating an uplink throughput value and a downlink throughput value of each of the base stations, and comparing the uplink throughput values and the downlink throughput values calculated for the base stations with the uplink throughput required values and the downlink throughput required values of the base stations.

\* \* \* \* \*